United States Patent [19]

Fujiwara

[11] 4,113,229
[45] Sep. 12, 1978

[54] SPHERICAL VALVE ASSEMBLY

[76] Inventor: Katsuji Fujiwara, 191, Nishitani, Hiroaka-cho, Kakogawa-shi, Hyogo-ken, Japan

[21] Appl. No.: 804,589

[22] Filed: Jun. 8, 1977

Related U.S. Application Data

[63] Continuation of Ser. No. 621,127, Oct. 9, 1975, abandoned.

[30] Foreign Application Priority Data

Oct. 18, 1974 [JP] Japan .................................. 49/120475

[51] Int. Cl.² ............................................. F16K 25/00
[52] U.S. Cl. ..................................... 251/174; 251/308; 251/315; 251/316
[58] Field of Search ................. 251/308, 174, 315, 306

[56] References Cited

U.S. PATENT DOCUMENTS

| 1,230,882 | 6/1917 | Filbey | 251/308 X |
| 3,091,428 | 5/1963 | Magos | 251/174 X |
| 3,173,647 | 3/1965 | Bryant | 251/174 X |
| 3,387,815 | 6/1968 | Richards | 251/174 |
| 3,593,960 | 7/1971 | Scaramucci | 251/315 X |
| 3,860,032 | 1/1975 | Rogers | 251/315 X |
| 3,894,718 | 7/1975 | Koch | 251/174 X |

FOREIGN PATENT DOCUMENTS 863,360  1/1941  France ..................................... 251/174

Primary Examiner—Harold W. Weakley
Attorney, Agent, or Firm—Toren, McGeady and Stanger

[57] ABSTRACT

A spherical valve assembly wherein a valve sphere is operatively fitted in position within a fluid passageway through said valve assembly provides an integrally formed stem member having a valve stem and a sustaining stem for said valve sphere, with the integrally formed stem member extending through the valve sphere in supporting engagement therewith. A valve casing is configured to provide a valve stem orifice and a sustaining stem recess wherein the valve stem and the sustaining stem are, respectively, mounted. Valve seat members are located to be urged against the valve sphere which is rotated to open and close the valve. By means of the specific structural orientation of the assembly, particularly the integrally formed stem member including the valve stem and the sustaining stem, an improved valve assembly which may be manufactured more easily is provided.

1 Claim, 7 Drawing Figures

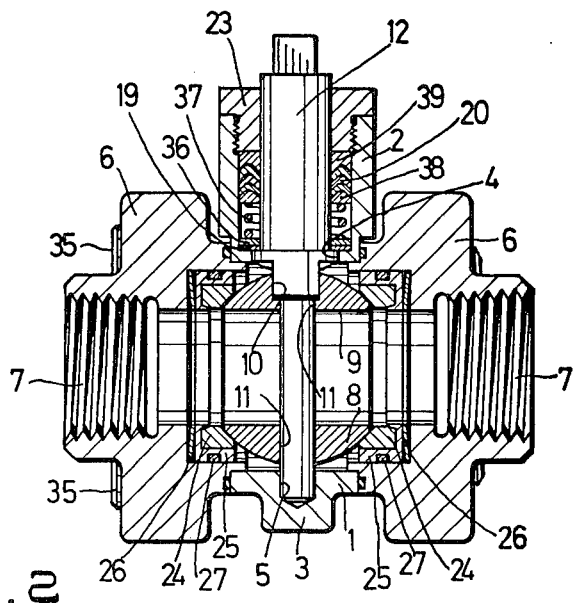
Fig. 1
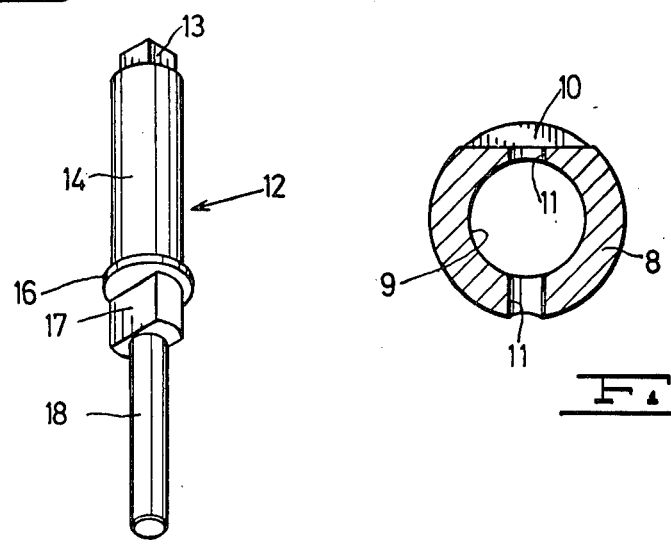
Fig. 2
Fig. 3

SPHERICAL VALVE ASSEMBLY

This is a continuation of application Ser. No. 621,127, filed Oct. 9, 1975, now abandoned.

BACKGROUND OF THE INVENTION

The present invention relates generally to the structure and configuration of a spherical have valve assembly and more particularly to a valve assembly of the type wherein a fluid passage is opened and closed by rotating a valve sphere arranged within the fluid passage of the assembly. More specifically, the present invention is intended to overcome functional and manufacturing difficulties which may arise in prior art spherical valves. By virtue of the specific structural configuration of the invention, a spherical valve assembly may be manufactured with greater ease and less expense while providing improved operational characteristics.

DISCUSSION OF THE PRIOR ART

Spherical valves of the type with which the present invention is concerned are known in the prior art. One such type of valve is depicted in the drawings wherein.

Figure 5:
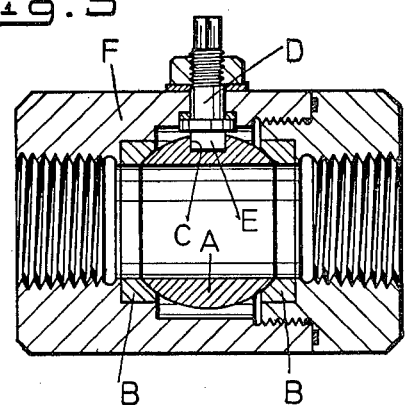
FIG. 5 is a sectional view of the fundamental structure of a conventional floating sphere type of spherical valve.

The prior art assembly depicted in FIG. 5 includes a valve sphere A which is arranged within a fluid passage and which is held on both sides thereof by a pair of valve seats B. A valve stem D includes a key E which is fitted into a key slot C formed on the upper side of the valve sphere A. Rotation of the valve stem D from the exterior of a valve casing F will operate to open and close the prior art valve depicted in FIG. 5.

It is a typical feature of such prior art spherical valves that the valve sphere A is held in position only by the seats B. Because of this, there results an increased contact pressure between the valve sphere A and the valve seats B which is located on the outlet side of the assembly when fluid pressure acts upon the valve sphere A.

Synthetic resins such as PTFE (polytetrafluoroethylene) and the like are usually used as the valve seat material. The reason for this is that PTFE and similar materials have low coeffiicents of friction and high elasticity characteristics. Another reason for the utilization of PTFE and the like materials is that creep or cold flow phenomenon accompanies their performance. So long as the contact pressure between the valve sphere and the valve seats exists for only a short time, the cold flow or deformation which occurs will nevertheless maintain reasonably good fitting tolerances with acceptable airtight sealing engagement between the valve sphere and the valve seat.

Because of this, spherical valves having the type of structural arrangement discussed above are mainly utilized for controlling fluid flow at low pressures and temperatures. Thus, such valves have a generally limited degree of application and their utilization is generally limited to situations wherein the control of fluid flow is to be performed at limited pressures and temperatures.

Figure 6:
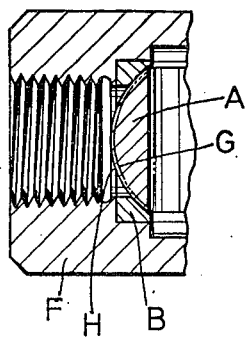
FIG. 6 is a fragmental sectional view illustrating the displacement of the valve sphere when the spherical valve depicted in FIG. 5 is in the closed position.
Figure 7:
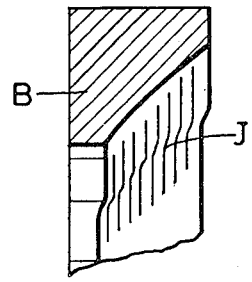
FIG. 7 is an enlarged fragmental view illustrating the deformation which may occur in the valve seat of the spherical valve shown in FIG. 5 at the half-opened position.

With reference to FIG. 6, an operating condition of the valve is shown in somewhat exaggerated form whereby the valve sphere is shown by the solid line H as displaced from an original position depicted by broken line G. When this condition occurs, the contact pressure between the valve sphere A and the valve seat B increases with the result that frictional resistance at the contact portions increases significantly. Secondly, the valve seat B cold flows into a permanent deformation and the valve seat sharply deforms at the boundary of the contact portion J at the edge of the fluid passage. Furthermore, the valve seat is subjected to a non-uniform deformation as a result of fluid pressure acting upon the valve sphere and upon the contact area between the valve sphere and the valve seat varying according to the rate of the valve opening.

Therefore, even in a situation wherein fluid flow at relatively low pressure and temperature is to be controlled, deformation, abrasion, jamming and similar effects occur in the valve seat thereby increasing its actuating torque. The aforementioned circumstances occur in an essentially similar fashion in valve seats which are made from metallic material and furthermore, since they lack elasticity, abrasions at the seat surface are so severe that leakage occurs within the valve and valve seizure results thereby causing severe increase in the torque required for actuating the valve. Thus, metallic seats are usually replaced by seats made by PTFE and similar materials and they are rarely used except in special applications.

Because of displacement of the valve sphere, certain countermeasures have been suggested by the prior art for application in spherical valves used for controlling fluid at low or medium pressures. Among these measures are the provision of lips to the valve seat, thickening of the valve seat, provision of an additional elastic member to increase elastic deformation of the valve seat, the addition of filler materials such as galss fibers to restrain cold flow deformation, and the provision of means to adjust the contact pressure between the valve seats and the valve sphere. However, these approaches have been found as inadequate particularly in view of the complicated structural configuration which results in the vicinity of the valve seat portion of the valve.

An additional countermeasure, which has been given consideration primarily with regard to larger size spherical valves which are utilized for controlling fluid at higher pressures and temperatures, involves the utilization of means for holding the valve sphere more securely upon the valve stem in order to prevent displacement of the valve sphere in the direction of fluid flow through the fluid passage by the action of fluid pressure. This type of spherical valve is referred to as a fixed valve sphere type in order to distinguish it from the aforementioned floating valve sphere type.

Thus, of the two types of valves presently known in the prior art, one type is so constructed that a valve stem, a valve sphere and a sustaining stem at the bottom of the sphere are formed in a single unitary body. The other type of valve is so constructed that the valve stem, valve sphere and sustaining stem are separately formed as different elements of the assembly with the three members thus formed being arranged in coaxial alignment during assembly of the valves. Although some conventional large size spherical valves have a construction wherein their sustaining stems are provided only to support the weight of the valve spheres, these valves are fully distinguished in their manufacture. Thus, it is found important to avoid displacement of the valve sphere, and to improve the accuracy of alignment of the valve stem, the valve sphere and the sustaining stem and to overcome problems such as increased actuating torque resulting from increase in the contact pressure between the valve stem and the valve seat.

In the type of spherical valve wherein the valve stem, the valve sphere and the sustaining stem are constructed as a single unitary member, it becomes inevitably necessary to divide the valve casing so that one part thereof bears the valve stem and another part bears the sustaining stem. As a result, top entry or bottom entry construction is applied to the smaller size spherical valves and in larger size valves efforts are directed toward utilization of a welding method of the divided parts of the casing. In such a type of construction, alignment of the valve stem bearing member with the member supporting the sustaining stem is an important aspect of the manufacture but is found difficult to achieve. Thus, the valve is constructed of such a member that the bearing elements are formed separately from the casing and then the parts are assembled in an adjustable manner in the valve casing. However, this type of valve involves disadvantages since its construction is complex and great care is needed in the assembly procedure. Furthermore, such valves are generally overly large in size so that this type of valve construction is not practically adaptable for use except in larger size spherical valves.

In the type of spherical valve wherein the valve stem, the valve sphere and the sustaining stem are constructed as three separate elements, although alignment of the valve stem bearing member and the sustaining stem bearing member is relatively easy, it is difficult to tightly connect the valve stem with the valve sphere and the valve sphere with the sustaining stem, and to arrange the three numbers in alignment. Furthermore, when there is taken into consideration the accumulated tolerance errors which occur in the design, assembly and the like of such valves, displacement of the valve sphere will occur during the opening and closing actuation of the valves when irregular variation of fluid pressure occurs. Thus, it has been found that this type of construction does not reliably prevent increase of the contact pressure between the valve sphere and the valve seat nor is there exhibited characteristics which reliably protect the sealing effect of the valve seat. The valve stem and the sustaining stem, respectively, form a generally cantilevered construction for the valve sphere and as a result the ability to properly support the valve sphere is weakened. Furthermore, higher accuracy in finishing tolerances is required for the valve stem, the valve sphere and the sustaining stem, thereby making such a structural approach impractical. Again, this type of construction is found practically applicable only in larger sized spherical valves.

Thus, it is an aim of the present invention to overcome the aforementioned disadvantages and to provide a fixed sphere type of spherical valve wherein the valve sphere is accurately and firmly held in position, with the assembly having a simple construction with the elements thereof being easily manufactured and assembled and capable of wide usage in both small and larger sized valves.

SUMMARY OF THE INVENTION

Briefly, the present invention may be described as a spherical valve assembly comprising a valve casing formed of a set of casing members, means defining a fluid passage through the valve casing, with said set of casing members including an integrally formed main casing member with means in said main casing member defining therein a valve stem supporting orifice and a sustaining stem supporting recess arranged in axial alignment with each other. An integrally formed stem member for said valve assembly is configured to include a valve stem portion and a sustaining stem portion, said stem member being rotatably fitted within the main casing member with the valve stem portion fitted in the valve stem supporting orifice and with the sustaining stem portion fitted in the sustaining stem supporting recess. A valve sphere is mounted upon said stem member and is located within the fluid passage of the valve assembly for opening and closing the valve by rotation of the stem member. The valve sphere includes fitting openings for mounting the sphere upon the stem member and annular valve seat means are provided within the casing for supporting engagement with the valve sphere. The assembly includes means for urging the annular valve seat means into engagement with the valve sphere.

In the construction of the present invention, the valve stem supporting orifice and the sustaining stem supporting recess are arranged in alignment in the main casing member. The advantages and objects of the present invention are attained by this aspect of the structure of the assembly together with other structural aspects which include formation of the valve stem portion and the sustaining stem portion in a unitary, integral stem member, providing the fitting openings in the valve sphere whereby the sustaining stem portion may be securely fitted to connect the valve stem for rotary operation, and arranging the valve seat to be disposed within the fluid passage of the valve in a condition wherein the valve seat may be urged by resilient means into engagement with the valve sphere.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 4:
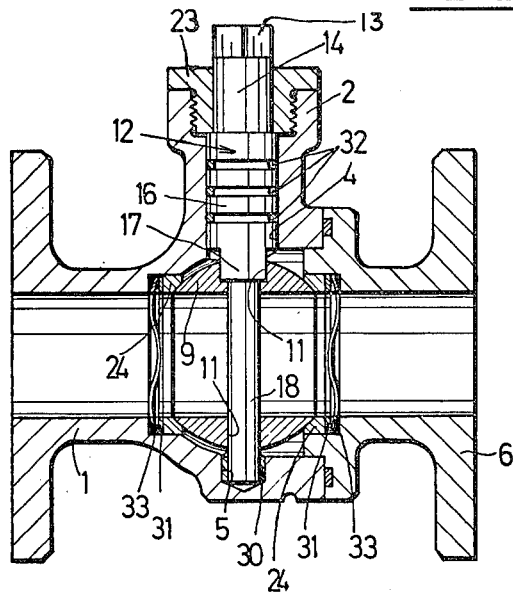

FIG. 1 is a sectional view of an embodiment of the present invention;

FIG. 2 is a perspective view of the stem member of the invention;

FIG. 3 is a cross sectional view of the valve sphere shown in the assembly of FIG. 1 taken vertically and perpendicularly to the plane of the drawing; and FIG. 4 is a sectional view of a second embodiment of the invention.

DETAILED DESCRIPTION OF THE PREFERRED EMBODIMENTS

Referring now to the figures of the drawing depicting the preferred embodiments of the present invention wherein like reference numerals are used to refer to similar parts throughout the figures thereof, the first embodiment of the invention depicted in FIGS. 1-3 is shown as comprising a valve casing formed of a set of casing members including an integrally formed main casing member 1 having a valve stem holding portion 2 at the upper part thereof. A sustaining stem holding portion 3 is located at the bottom of the main casing 1 and a cylindrical space is provided to form part of a fluid passage extending through the interior of the valve casing.

The main casing 1 includes a valve stem supporting orifice 4 and a sustaining stem supporting recess 5 which are bored coaxially in the casing. The upper portion of the stem orifice 4 provides a packing receiving hole having an enlarged inside diameter with a female thread being formed in the inner wall of its upper end.

The set of casing members forming the valve casing of the assembly includes a pair of end members 6 each having a flange and being located in engagement on opposite sides of the main casing member 1 with the overall casing unit being secured together through the flanges of the end members 6 by a pair of bolts 35. Each of the end members 6 includes a cylindrical space formed therein defining a part of the fluid passage through the valve assembly. Female screw threads 7 enabling piping to be connected to the valve assembly are formed on the inner wall of each respective end portion 6. On the side of each of the end members 6 adjacent the main casing member 1, an aperture of enlarged inside diameter is provided in order to accommodate a valve seat member 24.

A valve sphere 8 having a fluid passage orifice 9 bored therethrough and a key slot 10 at the upper portion thereof is provided in the valve assembly within the fluid passage thereof. Fitting holes 11 extending from the key slot 10 and perpendicularly to the fluid aperture 9 are formed in the valve sphere 8.

The assembly of the invention includes a stem member 12 shown in a perspective view in FIG. 2 as comprising an integrally formed unitary body having at its upper end a square or rectilinear portion 13 adapted to have a tool (not shown) engaged thereabout for turning the stem member 12. The member 12 includes a valve stem portion 14, a flanged portion 16 below the stem 14, a key portion 17 and a sustaining stem portion 18. The flanged portion 16 is adapted to be fitted into the valve stem aperture 4 located at the bottom of the valve stem holding portion 2. It is an essential feature of the invention that the flanged portion 16, the key portion 17, and the sustaining stem portion 18 be formed as a unitary body so that other portions of the device may be formed in separate bodies, if necessary.

The stem member 12 is fitted to extend below the valve stem aperture 4 with the key 17 within the key slot 10. The sustaining stem portion 18 is arranged to extend through the fitting holes 11 formed in the valve sphere 8 and the bottommost end of the sustaining stem 18 is arranged to extend into engagement with the sustaining stem supporting recess 5. As a result, there is provided an accurate and firm assembly of the stem member 12 and the valve sphere 8 in an appropriately aligned connection.

A slide ring 19 is arranged on the upper surface of the flanged portion 16 of the stem member 12. A washer 36, a spring 37, a bottom adapter 38, V-rings 20 and a top adapter 39 are arranged above the flanged portion 16. A plug 23 engaged about the upper portion of the valve stem 14 is secured by a threaded engagement at the upper end of the packing receiving orifice formed within the valve stem holding portion 2.

Annular valve seats 24 are received and maintained within valve seat holders 25 located within the enlarged portions of the openings formed in the end members 6. A pair of center bored disc springs 26 interposed between the shoulders of the enlarged openings in the end members 6 and the valve seat holders 25 urge the annular valve seats 24 against the valve sphere 8 to maintain a moderate contact pressure therebetween. The disc springs 26 have the advantage that they are capable of providing a sufficiently large spring force distributed uniformly about the periphery of the annular seats 24.

An O-ring 27 is interposed between the external periphery of the seat holders 25 and the internal wall of the casing.

In FIG. 4 there is depicted another embodiment of the present invention wherein the valve casing is formed by a set of casing members comprising a main casing 1 and an end member 6. A sustaining stem 18 is fitted in a sustaining stem supporting recess 5 with a bushing 30. The bushing is interposed to reduce wear and frictional resistance of the parts. Valve seats 24 are disposed in direct contact with the internal wall of the casings thereby eliminating the necessity for the O-ring 27. The disc spring 26 shown in the embodiment of FIG. 1 may be replaced by a corrugated spring 33. Additionally, a coiled spring, or a volume elastic substance such as rubber or the like can be applied in place of the springs 26 or 33. An annular liner 31 is interposed between the corrugated springs 33 and the valve seats 24 and O-rings 32 are provided between the valve stem portions of the stem member 12 and the valve stem orifice 4 in order to provide a seal therebetween.

In the function and operation of the device of the present invention, since the valve stem hole 4 and the sustaining stem hole 5 are bored in the main casing member 1 and constructed as a unitary body, it is a simple matter to accurately align the holes coaxially. Since the stem member 12 including the sustaining stem portion 18 is formed as a unitary integral body, it is easy to assemble the device with both portions in coaxial alignment and concentrically located.

Since the sustaining stem portion 18 of the stem member 12 is fitted tightly within the fitting holes 11 of the valve sphere 8, and since the lower flanged portion 16 and the sustaining stem 18 are respectively tightly fitted in the valve stem hole 4 and the sustaining stem hole 5, the stem member 12 and the valve sphere 8 may be easily aligned and their holding action will be accurately maintained with the valve sphere 8 rotating concentrically about the axis of the stem member 12 to avoid unwanted displacement under the action of fluid pressure. Furthermore, the stem member 12 provides a beam type construction for the valve sphere 8 and the sustaining stem portion 18 holds the sphere in position without bending under the influence of fluid pressure. Thus, an overall assembly which is more rigid and more securely formed will be provided.

As a result, the contact pressure between the valve seats 24 and the valve sphere 8 is not subjected to the action of fluid pressure within the assembly but is distributed uniformly and evenly about the entire periphery of the annular valve seats 24 by the elastic urging force of the springs 26 or the springs 33. Thus, the cold flow phenomenon has little effect on the assembly and deformation of the parts, abrasion thereof or jamming of the assembly is unlikely to occur in the valve seats and the actuating torque of the assembly will be maintained relatively constant and at a relatively low level. The valve seats 24 may be formed from material having a high durability since the frictional forces to which they are exposed will be relatively small and will occur uniformly about the entire periphery of the valve seats 24. Furthermore, this force is compensated by the disc springs 26 or their substitutes.

The spherical valve assembly of the present invention may be conveniently maintained inasmuch as its construction is simple and does not require careful alignment of the parts of the assembly. Furthermore, it is possible to use the assembly of the present invention in applications requiring either large or small size spherical valves in view of the favorable features arising in the construction, and manufacture thereof and in view of the attractive costs.

Furthermore, even if metallic valve seats are used, there may be provided a spherical valve assembly having a high air-tight sealing effect between the valve sphere and the valve seats, and in the case of synthethic resins such as PTFE, utilized as the material for the valve seats, it will be unnecessary to use specially shaped valve seats having unusual thicknesses or lips nor will it become necessary to provide adjusting means for the valve seats, thereby resulting in a significantly simplified valve seat construction.

The present invention offers additional advantages. In a case where an O-ring ring 27 is interposed between the valve seat holder 25 and the internal wall of the valve casing in a floating sphere type of valve, the O-ring will swell and tend to obstruct movement of the holder 25. Displacement of the valve seat holder is thereby prevented and the actuating torque will increase when it is attempted to displace the valve sphere 8. However, with the present invention, displacement of the valve sphere is rendered easier and therefore the aforementioned problem will not occur. Furthermore, the valve seats 24 are subject to minute displacements toward the valve sphere 8 due to wear and thermal expansion. Thus, a sufficiently high air-tight seal may be maintained even if the valve seats 8 contact directly with the internal walls of the valve casing. As explained above, according to the present invention, a high air-tight sealing effect can be provided by the valve seat portion with a valve construction which is relatively simple.

While specific embodiments of the invention have been shown and described in detail to illustrate the application of the inventive principles, it will be understood that the invention may be embodied otherwise without departing from such principles.

What is claimed is:
1. A spherical valve assembly comprising:
   a valve casing including an integrally formed main casing member and means defining a fluid passage through said valve casing;
   means in said main casing member defining therein a valve stem supporting orifice and a sustaining stem supporting recess arranged in axial alignment with each other on opposite sides of said fluid passage defined through said valve casing;
   a one-piece stem member including an upper valve stem portion, a flanged portion immediately adjacent thereto, a key portion adjacent said flanged portion and a sustaining stem portion extending from said key portion, said one-piece stem member being rotatably mounted within said valve casing to extend continuously across said fluid passage within and between said valve stem supporting orifice and said sustaining stem supporting recess with said upper valve stem portion fitted in said valve stem supporting orifice and with said sustaining stem portion fitted in said sustaining stem supporting recess thereby to mount said one-piece stem member to be rotatable about a substantially fixed immovable axis extending across said fluid passage;
   a valve sphere having defined therethrough a fluid flow passage orifice adapted to be aligned with said fluid passage of said valve casing when said valve is in the open condition, said valve sphere being mounted upon said sustaining stem portion of said one-piece stem member and located within said fluid passage with said sustaining stem portion of said stem member extending in a direction generally perpendicularly to said fluid flow passage orifice in said valve sphere,
   said valve sphere being structured to effect opening and closing of said fluid passage upon rotation of said one-piece stem member with simultaneous rotation therewith of said valve sphere;
   fitting openings defined in said valve sphere arranged to receive therethrough said sustaining stem portion for mounting said sphere upon said one-piece stem member with said sustaining stem portion thereof extending completely across said fluid flow passage orifice of said valve sphere between said fitting openings thereby mounting said sphere upon said sustaining stem portion in an arrangement fixedly attaching said sphere relative to said one-piece stem member in tight engagement therewith;
   a stem member receiving hole formed in said casing engaged about said flanged portion of said one-piece stem member;
   a key slot formed in said valve sphere immediately adjacent one of said fitting openings thereon and having said key portion of said stem member engaged therein;
   annular valve seat means displaceably mounted within said casing for supporting engagement with said valve sphere;
   means resiliently urging said annular valve seat means into engagement with said valve sphere to enable movement of said valve seat means relative to said casing thereby to absorb variations in dimensional tolerances between said valve seat means and said valve sphere to thus accommodate rotation of said one-piece stem member to enable said rotation to occur about said fixed axis with said valve sphere fixedly mounted upon said one-piece stem member in tight engagement therewith; and
   seat holders interposed between said valve seat means and said resiliently urging means;
   said valve casing including a pair of end members tightly engaging on opposite sides of said main casing member, said end members having formed therein orifices forming a part of said fluid flow passage, said orifices including enlarged portions wherein said valve seat means are mounted with said resiliently urging means being interposed between inner walls of said end members and said valve seat means.

* * * * *